(12) United States Patent
Herren

(10) Patent No.: US 6,520,436 B1
(45) Date of Patent: Feb. 18, 2003

(54) KITCHEN GRATER

(75) Inventor: Bruno Herren, Bern (CH)

(73) Assignee: Moha Moderne Haushaltwaren AG, Zollikofen (CH)

( * ) Notice: Subject to any disclaimer, the term of this patent is extended or adjusted under 35 U.S.C. 154(b) by 0 days.

(21) Appl. No.: 09/915,233

(22) Filed: Jul. 25, 2001

(30) Foreign Application Priority Data

Aug. 2, 2000 (CH) .................................... 2000 1514/00

(51) Int. Cl.⁷ .............................................. B02C 19/20
(52) U.S. Cl. .................................... 241/169; 241/285.2
(58) Field of Search ................................ 241/168, 169, 241/169.1, 285.1, 285.2, 273.1, 273.2

(56) References Cited

U.S. PATENT DOCUMENTS

| | | | | |
|---|---|---|---|---|
| 926,327 A | * | 6/1909 | Hoffman | 241/168 |
| 1,878,924 A | * | 9/1932 | Will | 220/568 |
| 3,552,460 A | * | 1/1971 | Cooney | 241/168 |
| 3,581,790 A | * | 6/1971 | Conte | 241/169.1 |
| 3,642,045 A | * | 2/1972 | Buvelot | 241/169.1 |
| D233,204 S | * | 10/1974 | Fisher | 241/169.1 X |
| 5,071,663 A | * | 12/1991 | Dugan | 241/168 |
| D333,762 S | | 3/1993 | Herren | |
| 5,261,613 A | | 11/1993 | Mullarky | |
| 5,967,434 A | * | 10/1999 | Virk | 241/169.1 |
| 6,082,648 A | * | 7/2000 | Marriere et al. | 241/282.1 |

FOREIGN PATENT DOCUMENTS

GB     1021720     3/1966

* cited by examiner

*Primary Examiner*—John M. Husar
(74) *Attorney, Agent, or Firm*—Pauley Petersen Kinne & Erickson

(57) ABSTRACT

A grater with a cylindrical housing which on an end side is limited by a grating insert arranged in a rotationally fixed and exchangeable manner. In the housing there is mounted a receiving cylinder with entraining means. The receiving cylinder accommodates the grating product and is rotationally and movably mounted. A pressing body which is axially movable in the receiving cylinder is in a positive-fit active connection with the entraining means of the receiving cylinder. The pressing body has a rotary knob projecting beyond the housing and the receiving cylinder in every position of use. In the housing, perpendicular to the longitudinal axis of the housing, there is arranged an insertion slot through which the exchangeable grating insert is insertable. In an inserted condition the grating insert rests on a support in the housing and is held in a positioned manner by a centric peg on the receiving cylinder.

10 Claims, 3 Drawing Sheets

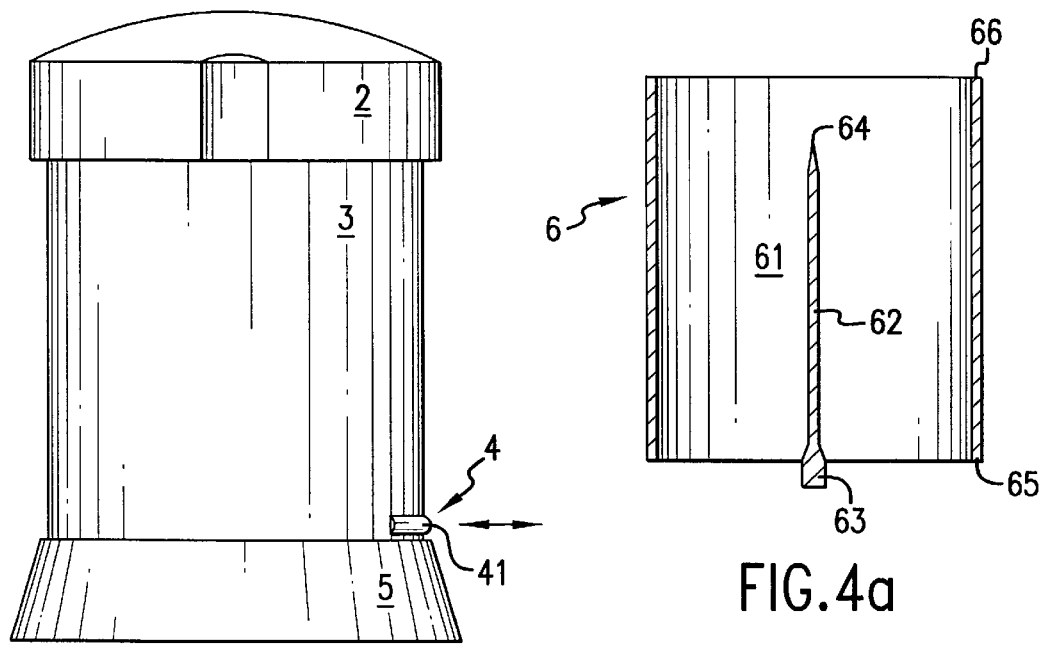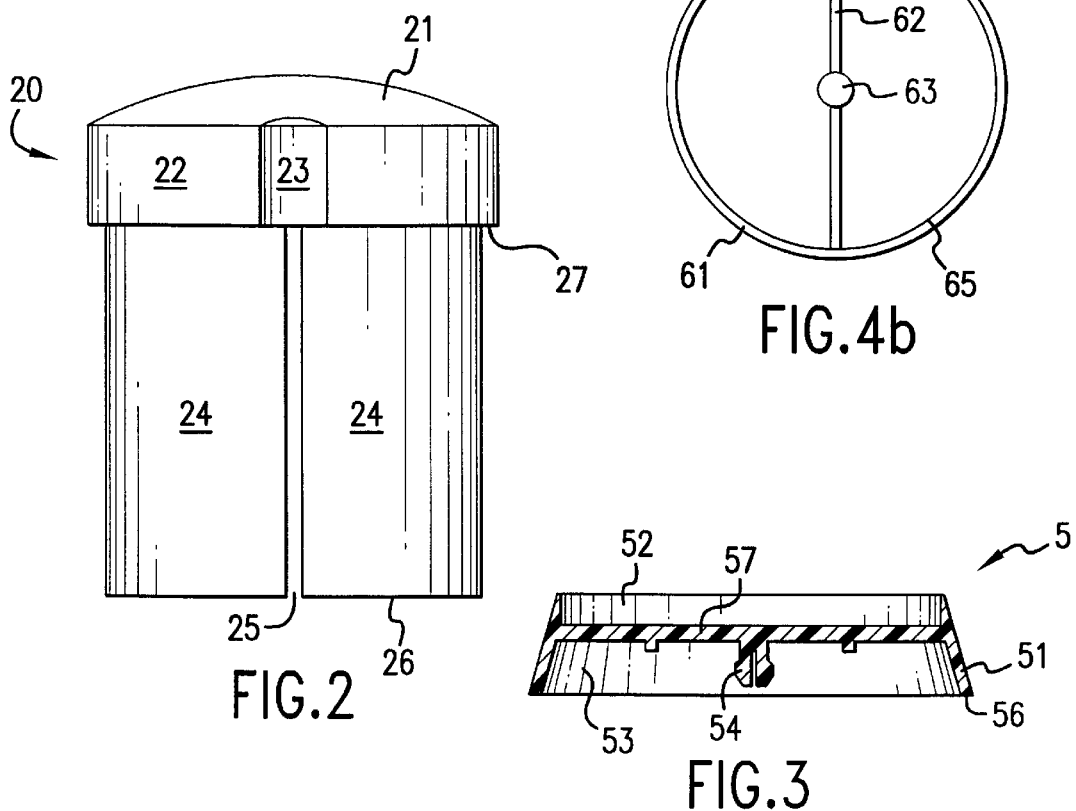

KITCHEN GRATER

BACKGROUND OF THE INVENTION

1. Field of the Invention

This invention relates to a grater with a cylindrical housing limited with a grating insert arranged in a rotatably fixed but exchangeable manner.

2. Description of Related Art

Graters, in particular cheese graters have been marketed by the applicant for many years with success on the world market. Because of their conceptional construction they may accommodate more grating product than traditional cheese graters which are formed pincer-like and have a grating drum driven by a crank. The grating drum is formed with the crank as one piece, held in the pincer-shaped housing and can be easily removed because it is not secured. Such graters are only designed for one grating fineness. Several drums with differing grating finenesses are not offered and would also require too much space because as mentioned they are connected to the crank as one piece.

Such graters are used for various foodstuffs. The most common application form is the use for grating cheese and thus hereinafter the grater may also be referred to as a cheese grater.

SUMMARY OF THE INVENTION

The form of the cheese graters of interest here comprises a cylindrical housing and the grater insert is formed as a grating disk of an essentially circular-disk-shaped planar sheet metal. The product to be grated lies in a coaxial receiving cylinder which is rotatably mounted in the cylindrical housing and has a diametrical wall as an entraining means. Centrally on the underside of the receiving cylinder there is arranged a carrier peg onto which the grating disk is stuck and is held in a secured manner by way of a split pin. The grating disk thus in the assembled condition is rigidly but rotatably held on the carrier peg and forms the base for the receiver of the grating product in the receiving cylinder. The receiving cylinder filled with grating product may be introduced by the user into the cylindrical housing so far until its lower end comes to lie on an inner annular shoulder of the housing. The grating disk has a multitude of peripheral recesses into which, in the position of usage, corresponding elevations of the annular shoulder engage. Thus the grating disk in the usage position may be rotated relative to the receiving cylinder but not relative to the housing. Into the receiving cylinder there may be introduced an axially displaceable pressing body by way of which the grating product can be pressed onto the grating insert. The pressing body has a diametrical slot into which the diametrical wall engages in the position of usage. With a rotary knob at the upper end of the pressing body this is rotatable and entrains the receiving cylinder with the grating product, by which this is moved over the grating insert and is grated.

In order to obtain fine or course grated product, various grating disks are offered. For changing the grating disk the receiving cylinder must be completely removed from the housing and the split pin pulled. Then the old grating insert may be removed and the new grating insert may be stuck on and secured again with the split pin. Thereafter the receiving cylinder may be filled with the grating product and introduced into the housing.

This procedure is perceived by the user to be partly complicated and thus there is a desire for a more simple exchange.

With the known graters the receiving cylinder must be introduced into the housing in an exact radial position. Otherwise, the elevations of the annular shoulder do not lie in the peripheral recesses of the grating disk. If on use the receiving cylinder is slightly lifted in the axial direction, the grating disk likewise loses its engagement on the housing. Without this counter bearing it co-rotates in both cases with the receiving cylinder and the grating product and it is no longer grated.

It is therefore one object of this invention to provide a device which alleviates these disadvantages, but retains the basic positive construction of the known device and exploits its tried and tested manner of functioning.

It is a further object of this invention to make available a device with which the product to be processed is not only grated but may also be rasped and/or cut into slices. Also, the device of this invention prevents the grating, rasping or cutting inserts which are not in use from getting lost.

The known apparatus of the applicant are mainly marketed as graters, in particular as cheese graters. In English speaking countries they are also known as cheese-mills. In the following specification, the terms grater, grate, grating product, grating insert, etc. are to be understood such that they also stand for rasping, shredding or slicing. According to the application, the product to be processed may be grated, rasped, shredded or sliced.

BRIEF DESCRIPTION OF THE DRAWINGS

In the following specification, by way of the accompanying drawings, different embodiments of this invention are described, wherein:

FIG. 1 is a lateral view of a grater according to this invention;

FIG. 2 is a lateral view of a pressing body according to FIG. 1;

FIG. 3 is a longitudinal section taken through a foot according to FIG. 1;

FIG. 4a is a longitudinal section taken through a receiving cylinder according to FIG. 1;

FIG. 4b is a bottom view of the receiving cylinder as shown in FIG. 4a;

FIG. 5c is a top view into the housing according to FIG. 5a;

DESCRIPTION OF PREFERRED EMBODIMENTS

Figure 5A:
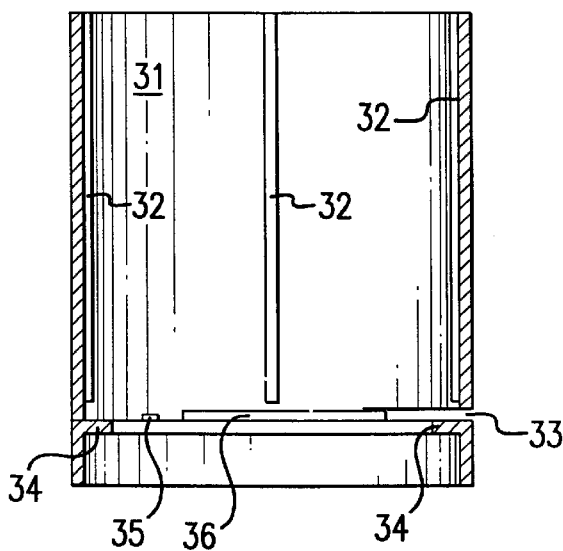
FIG. 5a is a longitudinal section taken through a housing, according to one embodiment of this invention.

The grater shown in FIG. 1 comprises a housing 3 into which, from above, a pressing body 2 is introduced. The base of the cylindrical housing 3 is inserted in a foot 5 and forms a non-positive accommodation. A grating insert 4 is introduced just above the upper edge of the foot 5 completely into the housing 3. As is indicated by the arrow, the insert 4 in a horizontal direction may be pulled out of the housing 3. As explained in the following specification, this however is not possible with the position of the pressing body 3 and of the location resulting therefrom of a receiving cylinder 6, which is not shown because it lies completely in the inside of the housing. In FIG. 1, the pressing body 2 is completely introduced into the housing 3. In this position the lower shoulder 27 of a rotating knob 20, shown in FIG. 2, of the pressing body 2 lies on the upper edge 66 of the receiving cylinder 6 shown in FIG. 4a. The cylindrical part 24 of the pressing body according to FIG. 2 which is introducible into the housing 3 is selected in diameter so that between the pressing cylinder 24 and the housing wall 31 there is still a place for the receiving cylinder 6.

Figure 5B:
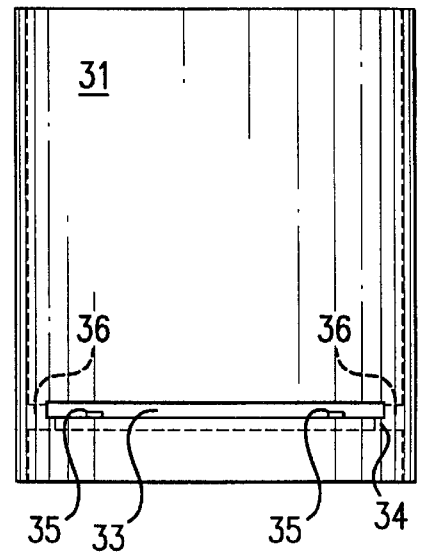
FIG. 5b is a lateral view of the housing according to FIG. 5a, with a view into the insertion slot with a removed insert.
Figure 5C:
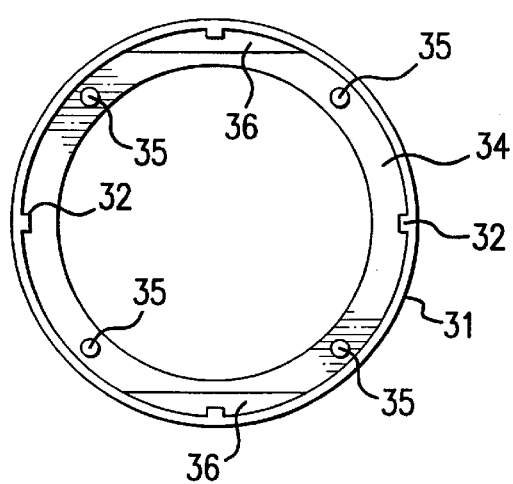

The housing 3 according to a preferred embodiment of this invention is shown in the FIGS. 5a to 5c. In a lower region of the cylindrical housing there is arranged a horizontal slot 33 for inserting the grating insert 4. The slot 33, as is evident from FIG. 5b, does not completely extend over half the periphery of the housing. In the inside of the housing there is attached a support ring 34 which runs flush with the lower edge of the insertion slot 33. On the support ring 34 there are formed two parallel elevations 36 running in the insertion direction, which serve the introduction of the grating insert 4 during the exchange and simultaneously represent a rotationally secure mounting of the grating insert 4. In a preferred embodiment of this invention as shown in FIGS. 5a to 5c, the support ring 34 further as holding and centering means comprises four cams 35 which fit together with corresponding means of the grating insert 4 when located in a completely inserted position in the housing 3.

Inside of the housing 3, as shown in FIGS. 5a and 5c, there are arranged four longitudinal ribs 32' to 32'" which retain the receiving cylinder 6 in a centered position in the housing 3.

Figure 6A:
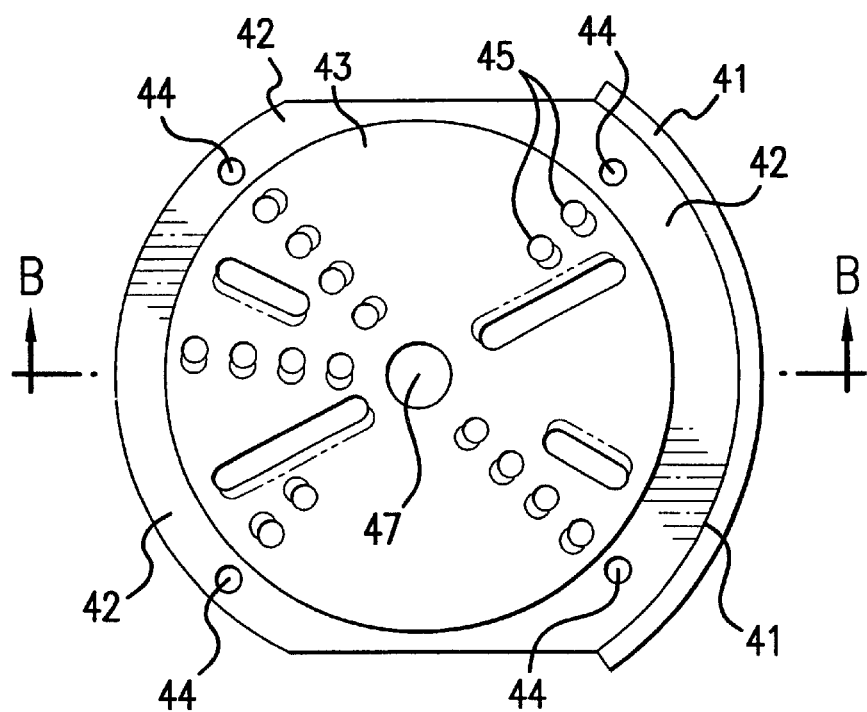
FIG. 6a is a top view of a grating insert.
Figure 6B:
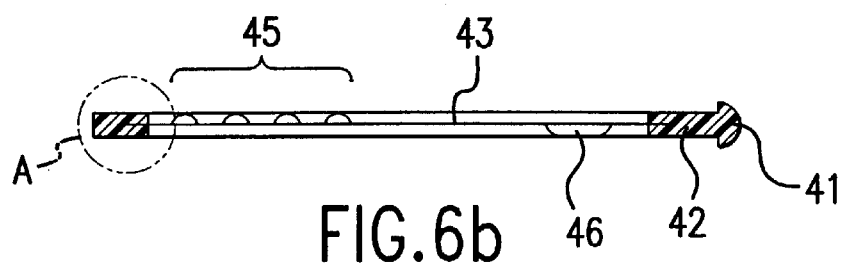
FIG. 6b shows an insert according to FIG. 6a, in a longitudinal section taken along line B—B.
Figure 6C:
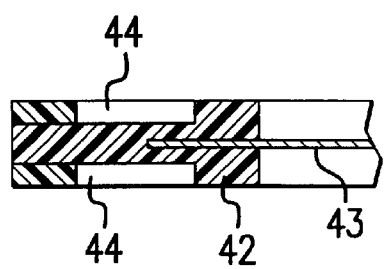
FIG. 6c shows a detailed enlargement of region A as shown in FIG. 6b.

The exchangeable grating insert 4 according to one embodiment of this invention is shown as a double-sided rasping and slicing insert in FIGS. 6a to 6c. There is a circular metallic grating insert 43 with a plastic bordering 42. The plastic bordering 42 comprises a retaining and centering means recesses 44 which fit together with the cams 35 on the support ring 34. The recesses 44 are shown in detail in FIG. 6c.

Since the grating insert 4 is preferably usable on both sides the recesses 44 are incorporated on both sides in the plastic bordering 43. As shown in the section of FIG. 6b, on the upper side of the grating insert there are arranged rasping cutters 45 while on the lower side displaced to the hole there are located slicing cutters 46.

The bordering 42 comprises an edge thickening 41 which covers the receiving slot 33 and which simplifies the introduction and removal of the insert 4 and also prevents the falling-out of grating product through the slot 33.

As further retaining and centering means there acts a central opening 47 of the grating disk 43 and a central peg 63 of the receiving cylinder 6. If the grating insert 4 from the side is completely inserted into the housing 3, then from above the receiving cylinder 6 may be introduced so far into the housing until the lower edge 65 of the cylinder wall 61 rests on the plastic bordering 42 of the grating insert 4. In this position, the peg 63 of the receiving cylinder 6 passes completely through the opening 47 in the grating disk 43. The grating insert is thus secured double against falling out.

In a preferred embodiment of this invention, in the receiving cylinder 6 as an entraining means there is arranged a diametrically running wall 62 which in the upper region tapers towards an edge 64. In the operating condition of the grater this wall 62 engages into a slot passing diametrically through the pressing body 24. The tapering of the wall 62 towards the edge 64 simplifies the introduction into the slot 25. With the engagement the rotational movement of the rotary knob 20 is transmitted via the pressing body 24 onto the receiving cylinder 6 and the grating product therein located. On grating by the user the knob 20 is held with the one hand and the housing 3 with the other hand. The pressing body 2 and the receiving cylinder 6 rotate together with the grating product within the housing while the pressing body 2 and the grating product simultaneously are pressed in the direction of the grating insert 4.

The receiving cylinder 6 in a preferred embodiment of this invention projects beyond the cylindrical housing 3 at least slightly so that it is ensured that on grating even with a completely introduced pressing body this does not grate on the upper housing edge and thus prevent the rotational movement. The receiving cylinder 6 in contrast lies with wall surface 61 or lower edge 65 on the bordering 42 of the grating insert 4 and is thus slidingly mounted. The materials of the receiving cylinder 6 and/or the bordering 42 of the grating insert 4 are preferably of plastic and are selected so that the friction coefficient is low.

On the other hand the pressing body 24 is slightly shorter than the receiving cylinder 6 so that the base surface 26 of the pressing body 24 does not contact the grating disk 43, but at the same time the grating product may be grated up to a minimal rest.

The rotary knob 20 of the pressing body 2 comprises a laterally circumferential grip surface 22 with three uniformly distributed gripping hollows 23. These features together with a curved upper wall 21 allow the rotary knob 20 to lie well in the hand and the grater can thus be simply operated.

If the grater is no longer used, then the foot 5 may be stuck on which is shown in FIG. 3. In a preferred embodiment of this invention, the foot 5 with its broadened base 56 offers a secure standing for the grater. A base 57 divides the foot 5 into an upper receiving space 52 in which the base of the housing 3 is accommodated with a non-positive fit, and into a lower receiving space 53 in which numerous grating inserts may be releasably clampingly held on a central clamping peg 54. With the doubled base 5 it is possible for the grating inserts 4 which are just not in use to always be handy and are maintained, not lost, by keeping them stored away from the grater. The diameter of the resilient head-like thickening of the clamping peg 54 is matched to the diameter of the central opening 47 of the grating insert 4 so that without great force effort these may be stuck on and released again, but at the same time their secure retention is guaranteed.

In another preferred embodiment of this invention, all parts of the grater except for the grating disk 43 are manufactured of plastic, such as with an injection molding method. The used plastic materials are inexpensive to manufacture and are hygienic for use. Also, the design of this object provides many possibilities. Thus one may, for example, select from a wide variety of colors or individual parts, so that the housing 3 and/or the receiving cylinder 6 may be formed transparently thereby rendering the grated product which is visible from the outside. More noble material combinations such as wood, for example for the rotary knob 20 and/or base 5, or stainless steel for the housing, are also possible.

The base may either be formed as described above or as a more simple flexible closure without compartments or with an extended hollow space 52 as a receiving vessel for the grating product.

What is claimed is:

1. In a kitchen grater having a cylindrical housing (3) which on an end side is limited by a grating-insert (4) arranged in a rotationally fixed but exchangeable manner, wherein in the housing is mounted a receiving cylinder (6) with entraining means (62), the receiving cylinder (6) accommodating a grating product and being rotationally and movably mounted, wherein a pressing body (2) is axially movable in the receiving cylinder (6) and is in positive-fit active connection with the entraining means (62) of the receiving cylinder (6) and has a rotary knob (20) projecting beyond the receiving cylinder (6), the improvement comprising: the housing (3) having an insertion slot (33) in a direction perpendicular to a longitudinal axis of the housing (3), an exchangeable grating insert (4) insertable within the insertion slot (33), and in an inserted position of the grating insert (4) within the insertion slot (33) the grating insert (4) resting on a support means (34) of the housing (3) and a centric peg (63) of the receiving cylinder (6) passing through a central opening (47) of the grating insert (4) and holding the grating insert (4) in the inserted position.

2. In the kitchen grater according to claim 1, wherein the support means (34) comprises a support ring running flush with a lower edge bordering the insertion slot (33).

3. In the kitchen grater according to claim 2, wherein on the support ring (34) are formed two elevations running parallel in an insertion direction, which guide the grating insert (4) during an exchange and rotationally mount the grating insert (4).

4. In the kitchen grater according to claim 2, wherein the grating insert (4) is a metal grating disk (43) having a plastic bordering (42) which comprises a holding and centering means (44) which cooperate with a corresponding holding and centering means (35) on the support ring.

5. In the kitchen grater according to claim 4, wherein recesses in the plastic bordering (42) and fitting cams (35) on the support ring provide a positive fit.

6. In the kitchen grater according to claim 4, wherein the grating insert (4) is usable on both sides and the holding and centering means (44) in the plastic bordering (42) is incorporated on both sides.

7. In the kitchen grater according to claim 4, wherein the plastic bordering (42) comprises an edge bulge (41) covering the receiving slot (33).

8. In the kitchen grater according to claim 4, wherein the receiving cylinder (6) with a lower side (65) of a surface wall (61) of the receiving cylinder (6) slidingly bears on the bordering (42) of the grating insert (4).

9. In the kitchen grater according to claim 1, wherein the receiving cylinder (6) at least slightly projects beyond the cylindrical housing (3), the pressing body (24) is shorter than the receiving cylinder (6) in which there is arranged a diametrically running wall (62) which in an operating condition of the kitchen grater engages into a diametrical slot (25) passing through the pressing body (2).

10. In a kitchen grater having a cylindrical housing (3) which on an end side is limited by a grating insert (4) arranged in a rotationally fixed but exchangeable manner, wherein in the housing is mounted a receiving cylinder (6) with entraining means (62), the receiving cylinder (6) accommodating a grating product and being rotationally and movably mounted, wherein a pressing body (2) is axially movable in the receiving cylinder (6) and is in positive-fit active connection with the entraining means (62) of the receiving cylinder (6) and has a rotary knob (20) projecting beyond the receiving cylinder (6), the improvement comprising: in a direction perpendicular to a longitudinal axis of the housing (3), the housing (3) having an insertion slot (33) through which the exchangeable grating insert (4) is insertable and in an inserted condition the grating insert (4) resting on a support means (34) in the housing (3) and held in a positioned manner by a centric peg (63) on the receiving cylinder (6), and a foot (5) in which the cylindrical housing (3) has a non-positive accommodation and which comprises a lower receiving space (53) in which the grating insert (4) is fastenable in a clampingly releasable manner on a central clamping peg (54) of the foot (5).

* * * * *